Patented Mar. 11, 1947

2,417,119

UNITED STATES PATENT OFFICE 2,417,119

SYNTHESIS OF OLEFINS BY REACTING AN OLEFIN WITH AN ALKYL HALIDE IN THE PRESENCE OF CALCIUM OXIDE

Verle A. Miller and Wheeler G. Lovell, Detroit, Mich., assignors to General Motors Corporation, Detroit, Mich., a corporation of Delaware No Drawing. Application December 3, 1942, Serial No. 467,808

11 Claims. (Cl. 260—677)

The invention relates to a method of synthesizing organic compounds and more particularly to the production of hydrocarbons or derivatives thereof. It has especial relation to the synthesis of such products having as a starting material a hydrocarbon in which a double bond is present and including as a step the introduction of one or more alkyl groups to replace hydrogen.

The substitution of an alkyl group for hydrogen in a compound containing a double bond has in the past been a difficult undertaking generally involving a series of chemical reactions carried out separately and successively. As a result, the process has been laborious and expensive and of little commercial use.

In accordance with the present invention this result is accomplished in a single stage without separately isolated intermediate steps so that the synthesis may be carried out readily and cheaply. Consequently, the process has great practical importance since it enables compounds to be produced having a definite and predetermined molecular structure.

One of the features of the present invention comprises carrying out a reaction between an olefin and an alkyl halide in the presence of an alkali so that the products consist of a higher olefin containing one or more additional alkyl groups and an alkali halide and water. We have used methyl chloride and methyl iodide as the alkyl halide. Methyl chloride reacts readily, under the proper conditions, with the olefins 2-methyl-2-butene, 2-methyl-1-butene, 2-pentene, 2,3-dimethyl-2-butene, 2,3-dimethyl-1-butene, 2,2,3-trimethyl-3-butene and various mixtures, so that, under the proper conditions, the reaction appears to be a quite general one for the introduction of a methyl group into an olefin.

Another feature of this new reaction is that under suitable conditions it proceeds very smoothly and cleanly so that the primary products of methylation amount to over 95% of the total products. It is also worthy of note that the usual accompaniments of organic reactions such as carbon tars and miscellaneous complex and unidentified products are insignificant.

A most important feature of the reaction is that the methyl groups which are added to the original molecule may be added almost exclusively adjacent to the double bond. Consequently, by suitable choice of starting material, the resulting products are olefins which contain a large amount of branching of the largest carbon chain in the molecule, or a plurality of methyl groups in the molecule. Such compounds, although they have in the past been difficult to prepare readily, have a very special value.

A special value of these compounds, although this invention is not limited in application thereto, lies in the field of fuels for internal combustion engines. It is well known that the properties of such fuels as regards their antiknock properties, vary greatly with their molecular structure. As an example, a hydrocarbon having the formula $C_7H_{16}$ may be n-heptane having the carbon atoms arranged in a straight chain, or it may be 2,2,3-trimethyl butane, having a highly branched structure, and 5 methyl groups instead of the 2 which n-heptane has. The former has an antiknock value indicated by an octane number of zero, while the octane number of the latter is very far above 100. The use of the latter in a suitable engine thus permits obtaining much greater power or thermal efficiency than were the former used. Such gains may be very great, and are known to amount to severalfold increases in the power output of a suitable engine.

It is also known from investigations which have been under way in our laboratories for many years, that the antiknock value of paraffin hydrocarbons, for instance, is related to the number of carbon atoms in the molecule which represent methyl groups. Consequently, a method of making hydrocarbons containing a large proportion of methyl groups in the molecule is of very great value for producing superior fuels, especially if the method is relatively simple and direct as is the present invention.

A specific example of the invention may be cited as the manufacture of 2,2,3-trimethylbutane by first producing 2,2,3-trimethyl-3-butene. This example is given because this particular fuel is the best from the anti-knock standpoint of any paraffin fuel of which we have knowledge at present. However, the invention is not limited to this particular example, as many other products have been produced by this invention, depending upon the initial materials used, as has already been stated, and the conditions under which the reaction is permitted to take place.

A specific example of procedure is as follows: Ten gram mols of trimethyl ethylene are introduced into a closed container of about 2800 cc. partially filled with 12 mols of quicklime or calcium oxide, and heated to about 220–225° generating a pressure of about 900 lbs. per square inch. Slowly, and with stirring, methyl chloride is introduced so that reaction sets in after a short induction period as indicated by a rise in temperature and fall in pressure, and the rate of addition is controlled so that the temperature rise is not excessive and the pressure remains within reasonable limits. The reaction is allowed to proceed until about 8 gram mols of methyl chloride have been added over a period of several hours. The reaction is allowed to proceed towards completion as indicated by a decrease in the rate of pressure fall, and final pressures near or below the starting pressure.

The liquid or gaseous products are then released from the container through a condenser. It will be found that about 10% of the methyl chloride has not reacted, that 5% goes to form dimethyl ether, 27% to form hexenes, both 2,3-dimethyl-2-butene, and 2,3-dimethyl-1-butene in about equal amounts, 40% to form 2,2,3-trimethylbutene, and 18% to form octenes and higher. About 40% of the original trimethyl ethylene is recovered containing a small proportion of 2-methyl-1-butene with the 2-methyl-2-butene or trimethyl ethylene.

The lime is also removed from the reacting container as a fine dry white powder. Calcium chloride and calcium hydroxide are contained in it in the proportions indicated by the products indicated previously.

In working up the reaction products the following is an example of possible procedure: The methyl chloride and methyl ether are distilled off and may be recovered and returned to the process. The 2,3-dimethyl-1-butene is separated to return to the process for further methylation, the 2,3-dimethyl-2-butene is also separated or it may be left with the 2,2,3-trimethyl-3-butene, and the latter also separated.

The 2,2,3-trimethyl-3-butene is readily hydrogenated, together with some of the 2,3-dimethyl-2-butene with it, to produce 2,2,3-trimethyl butane and 2,3-dimethyl butane from which the pure 2,2,3-trimethyl butane is readily separated by distillation.

This working up of the reaction products may be accomplished in various modified ways: all of the hexenes may be hydrogenated separately to produce a fuel of above 100 octane, the octenes may also be hydrogenated to produce a fuel of above 100 octane; or the combined reaction product hydrogenated directly to produce the saturated compounds which may be separated or used as a mixture in various proportions. The purpose of hydrogenating these compounds for fuel use is to impart to them a greater degree of stability and in some cases to improve their antiknock quality; but the important part of this invention is the production of the branched chain structure of the molecule or the large proportion of methyl groups.

There are a number of essential precautions that must be observed in carrying out the methylation reaction which seems, as previously stated, of general application.

As regards the physical conditions, we prefer a temperature such that the methyl chloride will react with the lime, and the olefin to be reacted will be in a sufficiently reactive state. Preferred temperatures for the olefins considered are in the range 210 to 240° C., and much higher temperatures result in the formation of higher boiling materials methane and ether. The methylation of trimethyl ethylene does not proceed at all at atmospheric pressures, and higher pressures are desirable from several standpoints. The reaction has been observed to proceed at pressures from 500 to 1500 lbs. per square inch. Such conditions are above the critical temperature and pressure of the reactants. When dealing with a batch reaction such as that described in the specific example, but to which we do not wish to limit ourselves, there is usually observed an induction period which may be as long as an hour during which the reaction does not proceed at a readily measurable rate. The use of the higher pressures may be of advantage in this connection.

As regards the choice of reactants, this depends obviously upon the products desired. Their purity is of importance, however. For example, it has been observed that the presence of peroxides in the trimethyl ethylene is of very great importance, and the presence of as little peroxide as that indicated by a peroxide number (milli-equivalents of peroxide per liter) of 25 will inhibit the reaction. Such inhibiting substances may be removed prior to reaction by distillation or chemical treatment, as for example, by reaction with sodium, or their formation, which is spontaneous even at room temperature when in contact with air or oxygen, may be inhibited by the addition of antioxidants such as hydroquinone, pyrogallol, or benzylaminophenol to the trimethyl ethylene, such inhibitors having no significant effect on the methylation reaction.

The choice of an alkali is also of great importance. We prefer to use quicklime or calcium oxide because of its availability and cheapness and the fact that it enters into the reaction at a temperature at which the other reactants are in a suitable condition. It also has the advantage that it serves two purposes: one may be thought of as being an absorbent for the hydrogen chloride formed in the reaction resulting in the formation of calcium chloride and another function being to combine with the water to form calcium hydroxide. We prefer to use calcium oxide rather than calcium hydroxide, consequently, since the use of the latter requires higher temperatures and such conditions promote the formation of ether and high boiling products. We prefer to use high calcium limes and they have a higher percentage of available calcium oxide. Since the presence of even very small amounts of active aluminum oxide promotes extensive side reactions, we prefer to use limes with a low content of alumina. The physical state of the lime is also important in this sensitive reaction. We prefer to use limes which have been prepared from the natural carbonate by calcination to the oxide, slaking to the hydroxide, an recalcination to the oxide again; and, in order that the methylation reaction may be rapid, we prefer that the latter calcination should be carried out so that a small amount, usually below 10%, of hydroxide be present in the product. We do not wish to be bound by theories as to the relation between the rate of reaction and the particle size of the lime, hydroxide content, purity, and alumina content, but prefer to use conditions, such as those mentioned, which result in a convenient rate of reaction and satisfactory final products.

The amounts of the reactants which may be employed may vary within wide limits and we have had experience with a great many large scale reactions, such as that mentioned in the specific example, in which operating conditions have been varied. The amount of lime used we prefer to keep above about 150% of that theoretically required in order to maintain a convenient rate of reaction, although larger amounts may be used if convenient. The amount of trimethyl ethylene used depends upon the operating pressures and capacity of the reactor which appears of advantage, and may be varied within the wide limits previously mentioned. We have found with regard to the amount of methyl chloride used that within the range of from 0.6 to 1.6 mols of chloride per mol of trimethyl ethylene, about a constant amount of 40% of the chloride reacts to form triptene, and most of the rest reacts to form hexenes and octenes and higher boiling products, the former (hexenes) decreasing with increasing ratio of chloride and the latter correspondingly increasing. Consequently, the preferred amount of methyl chloride used will depend upon a balance between the products desired and the capacity of the reactor.

While the specific example above is restricted to the formation of products of particular interest in the field of internal combustion engine fuels, it will be obvious that the methods are applicable generally to the treatment of olefins especially for the introduction of alkyl radicals into the molecule without destruction of the double bond. Therefore, we do not wish to be restricted to the specific disclosure except as required by the terms of the claims.

We claim:

1. The process of producing olefins of higher carbon content comprising treatment of trimethyl ethylene with methyl chloride in the presence of calcium oxide at a temperature of 210°–240° C. and under a pressure of 500–1500 pounds per square inch.

2. The process of introducing an alkyl radical into an olefin in a position adjacent to the double bond comprising treatment of the olefin with a halide of the alkyl radical under pressures upwards of 500 lbs. per square inch and temperatures upwards of 200° C., in the presence of a metal oxide capable of reacting with the halide at the temperature and pressure employed.

3. The process of methylating olefins comprising reacting an olefin with a methyl halide in the presence of calcium oxide, thereby forming an olefin of higher carbon content.

4. The process of methylating olefins comprising reacting an olefin with methyl chloride in the presence of calcium oxide, thereby forming an olefin of higher carbon content.

5. The process of methylating tetramethylethylene comprising reacting said olefin with methyl chloride in the presence of calcium oxide, thereby forming an olefin of higher carbon content.

6. The process of methylating tetramethyl ethylene comprising forming a mixture of said olefin and methyl chloride and heating said mixture in the presence of calcium oxide, thereby causing a reaction resulting in removal of hydrogen from said olefin and introduction of a methyl radical to form an olefin of higher carbon content.

7. The process of producing olefins of higher carbon content comprising treatment of trimethylethylene with methyl chloride in the presence of calcium oxide at temperature and pressure above atmospheric and sufficient to cause reaction between the chloride and the oxide and replacement of hydrogen of the trimethylethylene by the methyl radical.

8. The process of synthesizing higher olefins comprising forming a mixture of an olefin and a methyl halide and heating said mixture in the presence of calcium oxide, thereby bringing about a reaction in which hydrogen is removed from the olefin and a methyl radical is introduced therein to form an olefin of higher carbon content.

9. The process of synthesizing higher olefins comprising forming a mixture of an olefin and methyl chloride and heating said mixture in the presence of calcium oxide, thereby bringing about a reaction in which hydrogen is removed from the olefin and a methyl radical is introduced therein to form olefin of higher carbon content.

10. The process of methylating olefins comprising reacting an olefin with a methyl halide in the presence of lime prepared by calcination of calcium carbonate to the oxide, slaking the oxide to the hydroxide and recalcination of the hydroxide to the oxide, said recalcination being stopped short of completion so that a small proportion of hydroxide remains, thereby forming an olefin of higher carbon content.

11. The process of methylating tetramethylethylene comprising reacting said olefin with methyl chloride in the presence of lime prepared by calcination of calcium carbonate to the oxide, slaking the oxide to the hydroxide and recalcination of the hydroxide to the oxide, said recalcination being stopped short of completion so that a small proportion of hydroxide remains, thereby forming an olefin of higher carbon content.

VERLE A. MILLER.
WHEELER G. LOVELL.

REFERENCES CITED

The following references are of record in the file of this patent:

UNITED STATES PATENTS

| Number | Name | Date |
|---|---|---|
| 1,868,127 | Winkler | July 19, 1932 |
| 2,204,215 | Greensfelder et al. | June 11, 1940 |
| J.A.C.S.60 | Simons et al. | 2956–7 (1938) |
| 1,026,419 | Webel | May 14, 1912 |
| 1,298,929 | Graul et al. | Apr. 1, 1919 |
| 2,181,640 | Deanesly et al. | Nov. 28, 1939 |